United States Patent
McCurdy et al.

(10) Patent No.: US 12,139,657 B1
(45) Date of Patent: Nov. 12, 2024

(54) EMULSIFIERS AND EMULSIONS AS BY-PRODUCTS OF FERMENTATION, COMPOSITIONS COMPRISING SAME, AND METHODS OF USE THEREOF

(71) Applicant: POET Research, Inc., Sioux Falls, SD (US)

(72) Inventors: Alex T. McCurdy, Sioux Falls, SD (US); Steven T. Bly, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 582 days.

(21) Appl. No.: 17/196,646

(22) Filed: Mar. 9, 2021

Related U.S. Application Data (60) Provisional application No. 62/987,838, filed on Mar. 10, 2020.

(51) Int. Cl.
| | |
|---|---|
| C09K 23/00 | (2022.01) |
| A23K 10/38 | (2016.01) |
| A23K 20/147 | (2016.01) |
| A23K 20/158 | (2016.01) |
| C09K 23/30 | (2022.01) |

(52) U.S. Cl.
CPC ............ *C09K 23/018* (2022.01); *A23K 10/38* (2016.05); *A23K 20/147* (2016.05); *A23K 20/158* (2016.05); *C09K 23/30* (2022.01)

(58) Field of Classification Search
CPC ...... C09K 23/018; C09K 23/00; C09K 23/16; A23K 10/38; A23K 20/147; A23K 20/158
See application file for complete search history.

(56) References Cited

U.S. PATENT DOCUMENTS

| | | |
|---|---|---|
| 6,514,332 B2 | 2/2003 | Varnadoe et al. |
| 6,764,542 B1 | 7/2004 | Lackey et al. |
| 6,776,832 B2 | 8/2004 | Spence et al. |
| 7,582,458 B2 | 9/2009 | Grichko |
| 7,601,858 B2 | 10/2009 | Cantrell et al. |
| 7,842,484 B2 | 11/2010 | Lewis |
| 8,114,926 B2 | 2/2012 | Sun et al. |
| 8,163,059 B2 | 4/2012 | Tran et al. |
| 8,608,845 B2 | 12/2013 | Naidoo et al. |
| 8,702,819 B2 | 4/2014 | Bootsma |

(Continued)

FOREIGN PATENT DOCUMENTS

| | | |
|---|---|---|
| BR | PI0704791 A2 | 7/2009 |
| EP | 2656834 A1 | 10/2013 |

(Continued)

OTHER PUBLICATIONS

Rho (Rho et al. Nutritive value of corn distiller's dried grains with solubles steeped without or with exogenous feed enzymes for 24 h and fed to growing pigs. J Anim Sci. Jun. 4, 2018;96(6):2352-2360) (Year: 2018).*

(Continued)

*Primary Examiner* — Changqing Li
*Assistant Examiner* — Carrie Glimm
(74) *Attorney, Agent, or Firm* — Honigman LLP (57) ABSTRACT

Emulsifiers and emulsions obtained as by-products of corn fermentation, compositions comprising the same, and methods of making and using the emulsifiers and emulsions are provided.

13 Claims, 1 Drawing Sheet

(56) References Cited

U.S. PATENT DOCUMENTS

| | | | |
|---|---|---|---|
| 8,765,425 | B2 | 7/2014 | Dicosimo et al. |
| 8,765,985 | B2 | 7/2014 | Hora et al. |
| 8,808,445 | B2 | 8/2014 | Coe |
| 8,901,330 | B2 | 12/2014 | Doyle et al. |
| 9,061,987 | B2 | 6/2015 | Bootsma |
| 9,139,803 | B2 | 9/2015 | Redford |
| 9,290,728 | B2 | 3/2016 | Bootsma |
| 9,388,100 | B2 | 7/2016 | Redford |
| 9,416,274 | B2 | 8/2016 | Frank |
| 9,481,794 | B2 | 11/2016 | Cox |
| 9,617,425 | B1 | 4/2017 | Moriyasu et al. |
| 9,695,449 | B2 | 7/2017 | Bootsma |
| 9,765,280 | B2 | 9/2017 | Kurth et al. |
| 9,783,458 | B2 | 10/2017 | Martin |
| 9,896,643 | B2 | 2/2018 | Redford |
| 10,113,187 | B2 | 10/2018 | Bushong et al. |
| 10,167,390 | B2 | 1/2019 | Cox |
| 10,323,148 | B1 | 6/2019 | Brewster et al. |
| 10,526,623 | B2 | 1/2020 | Bootsma |
| 10,584,304 | B2 | 3/2020 | Schnell et al. |
| 10,604,776 | B2 | 3/2020 | McCurdy et al. |
| 10,781,464 | B2 | 9/2020 | Yoshida et al. |
| 2004/0063184 | A1 | 4/2004 | Grichko |
| 2006/0089429 | A1 | 4/2006 | Buras et al. |
| 2006/0215483 | A1 | 9/2006 | Helf |
| 2008/0314294 | A1 | 12/2008 | White et al. |
| 2009/0137705 | A1 | 5/2009 | Faucon Dumont et al. |
| 2010/0034586 | A1 | 2/2010 | Bailey et al. |
| 2011/0086149 | A1 | 4/2011 | Bootsma |
| 2012/0060722 | A1 | 3/2012 | Montpeyroux et al. |
| 2013/0157324 | A1 | 6/2013 | Dicosimo et al. |
| 2014/0230693 | A1 | 8/2014 | Gonzalez Leon et al. |
| 2016/0145650 | A1 | 5/2016 | Lewis et al. |
| 2017/0022364 | A1 | 1/2017 | Cox |
| 2017/0145642 | A1 | 5/2017 | Swanson |
| 2018/0273988 | A1 | 9/2018 | Lewis et al. |
| 2018/0340067 | A1 | 11/2018 | McCurdy et al. |
| 2018/0340068 | A1 | 11/2018 | McCurdy et al. |
| 2019/0249109 | A1 | 8/2019 | Lamprecht et al. |
| 2019/0376002 | A1 | 12/2019 | Urban et al. |
| 2020/0063168 | A1 | 2/2020 | Bootsma |
| 2020/0131403 | A1 | 4/2020 | McCurdy |

FOREIGN PATENT DOCUMENTS

| | | | |
|---|---|---|---|
| JP | 005154467 | 6/2005 | |
| WO | 2004081193 A2 | 9/2004 | |
| WO | 2008061120 A2 | 5/2008 | |
| WO | 2009120419 A1 | 10/2009 | |
| WO | 2010077141 A1 | 7/2010 | |
| WO | 2012109221 A1 | 8/2012 | |
| WO | 2015181308 A1 | 12/2015 | |
| WO | 2018031540 A1 | 2/2018 | |
| WO | 2018217198 A1 | 11/2018 | |
| WO | WO-2018236919 A2 * | 12/2018 | ............ A23J 1/005 |
| WO | 2019103903 A1 | 5/2019 | |

OTHER PUBLICATIONS

Yao (Improved Corn Ethanol Fermentation and Oil Distribution by Using Polysaccharide Hydrolyzing Enzymes. J. Bioprocess Eng. Biorefinery 3, 323-331 (2014)) (Year: 2014).*

Baricco (Distillers Dried grains with Solubles (DDGS) in swine feeds: an European perspective. 2010. https://www.pig333.com/articles/distillers-dried-grains-with-solubles-ddgs-in-swine-feeds-an-europe_3630/) (Year: 2010).*

Woo (Woo et al. Genomics analysis of genes expressed in maize endosperm identifies novel seed proteins and clarifies patterns of zein gene expression. Plant Cell. Oct. 2001;13(10):2297-317) (Year: 2001).*

Bailey, Helen K., "Novel Uses of Vegetable Oil in Asphalt Mixtures", Ph.D Thesis, U. of East London, UK, (Sep. 2010), 366 pgs.

Bailey, Helen K., et al., "The Use of Vegetable Oil as a Rejuvenator for Asphalt Mixtures", 5th Eurasphalt and Eurobitume Congress, Istanbul, (Jun. 13-15, 2012), 10 pgs.

Bailey, Helen K., et al., "The Use of Vegetable Oil in Asphalt Mixtures, in the Laboratory and Field", 5th Eurasphalt and Eurobitume Congress, Istanbul, (Jun. 13-15, 2012), 12 pgs.

Moghaddam, Taher Baghaee, et al., "The use of rejuvenating agents in production of recycled hot mix asphalt: A systematic review", Construction and Building Materials 114, (2016), 805-816.

Winkler-Moser, Jill K., et al., "Composition and oxidative stability of crude oil extracts of corn germ and distillers grains", Industrial Crops and Products 33, (2011), 572-578.

Zaumanis, Martins, et al., "Use of Rejuvenators for Production of Sustainable High Content RAP Hot Mix Asphalt", The XXVIII International Baltic Road Conference, (2013), 10 pgs.

W.R. Gibbons et al: "Integrated biorefineries with engineered microbes and high-value co-products for profitable biofuels production", In Vitro Cellular & Development Biology Plant, vol. 45, No. 3, Apr. 3, 2009 (Apr. 3, 2009), pp. 218-228, XP055270849, US ISSN: 1054-5476, DOI: 10.1007/s11627-009-9202-1 *p. 224, right-hand column; figure 1*.

Yusoff et al. "Comparison of Fatty Acid Methyl and Ethyl Esters as Biodiesel Base Stock: a Review on Processing and Production Requirements". J Am Oil Chem Soc (2014) 91:525-531 DOI 10.1007/s11746-014-2443-0 (Year: 2014).

Golalipour, Amir, "Investigation of the Effect of Oil Modification on Critical Characteristics of Asphalt Binders", PhD Dissertation, U. of Wisconsin—Madison, [Online]. Retrieved from the Internet: URL: http: www.asphaltinstitute. orgwp-content uploads Thickness_Mix PhDDissertationDocument-Fi nal-AG2.pdf, (2013), 204 pgs.

Hughes, Stephen R, "Production of Candida antarctica lipase B gene open reading frame using automated PCR gene assembly protocol on robotic workcell and expression in an ethanologenic yeast for use as resin-bound biocatalyst in biodiesel production", Journal of the Association for Lab. Automation, 16(1), {Feb. 2011), 17-37.

Mogawer, Walaa S., "Evaluating the effect of rejuvenators on the degree of blending and performance of high RAP, RAS, and RAP RAS mixtures", Road Materials and Pavement Design, vol. 14, No. 2, (2013), 29 pgs.

Moreau, Robert A., "Changes in Lipid Composition During Dry Grind Ethanol Processing of Corn", Journal of the American Oil Chemist's Society, vol. 88, {Mar. 2010).

Seidel, Joseph C., "Rheological characterization of asphalt binders modified with soybean fatty acids", Construction and Building Materials, vol. 53, {Feb. 2014), 324-332.

Van Den Berg, Corjan, "Simultaneous clostridial fermentation, lipase-catalyzed esterification, and ester extraction o enrich diesel with butyl butyrate", Biotechnology and Bioengineering, vol. 110, No. 1, {Jan. 2013), 6 pgs.

Winkler, Jill K., "Phytosterol and Tocopherol Components in Extracts of Corn Distiller's Dried Grain", J_ Agric. Food Chem., 55(16), {Jul. 2007), 6482-6486.

Winkler-Moser, Jill K., "Antioxidant Activity of Phytochemicals from Distillers Dried Grain Oil", Journal of the American Oil Chemist's Society, vol. 86, {Mar. 2009), 1073-1082.

Zaumanis, Martins, "Influence of six rejuvenators on the performance properties of Reclaimed Asphalt Pavement RAP) binder and 100% recycled asphalt mixtures", Construction and Building Materials, vol. 71, {Nov. 2014), 14 pgs.

Bennert, Thomas, "Fatigue Performance of Re-Refined Engine Oil Bottoms (REOB) Modified Asphalt—A Laboratory Study", 95th Annual Transportation Research Board Meeting, (Jan. 2016), 26 pgs.

Zayas, et al. (Cereal Chem. 66, 263-267, 1989), 5 pages.

Majoni et al. (J. Am. Oil Chem. Soc. 88, 425-434, 2011), 10 pages.

Nikiforidis (J. Agric. Food Chem. 57, 5591-5596, 2009), 6 pages.

* cited by examiner

EMULSIFIERS AND EMULSIONS AS BY-PRODUCTS OF FERMENTATION, COMPOSITIONS COMPRISING SAME, AND METHODS OF USE THEREOF

CROSS-REFERENCE TO RELATED APPLICATION

This application claims the benefit of U.S. Provisional Application No. 62/987,838, filed on Mar. 10, 2020, which is incorporated herein by reference in its entirety.

TECHNICAL FIELD

Provided herein are methods, compositions, and uses for by-products obtained from large scale biorefinery operations for production of a target chemical, e.g. ethanol and by-products, e.g. dried distiller's grain, produced by fermenting a feedstock, e.g. corn, with an organism, e.g. yeast.

BACKGROUND

An emulsion is a mixture of two or more normally immiscible liquids. Emulsions contain both a dispersed and a continuous phase, with an interface at the boundary between the phases. Most emulsions are not formed spontaneously and require energy input to form: shaking, stirring, homogenizing, or exposure to power ultrasound (or high-intensity ultrasound), for example. Furthermore, most emulsions are inherently unstable and, over time, will revert to the stable state of the phases making up the emulsion.

U.S. Pat. No. 10,316,192 mentions a composition containing a polymerized oil and a surfactant emulsified in water with an imidazoline-based emulsifier for asphalt rejuvenator applications. The polymerized oil is produced by treating a corn oil with sulfur and heat to polymerize the oil.

WO 2019/103903 mentions an emulsion having a water content of the lipid phase of 10-80%. The emulsifier comprises an acetone-insoluble (AI) component that contains phospholipids including: phosphatidyl choline (PC), phosphatidyl inositol (PI), phosphatidyl ethanoloamine (PE), and phosphatidic acid (PA).

Zayas, et al. (*Cereal Chem.* 66, 263-267, 1989) mentions the use of hexane defatted corn germ protein to emulsify corn oil.

Stable emulsions and emulsifiers for making those emulsions are needed.

SUMMARY

Provided herein are methods, compositions, and uses for by-products obtained from large scale biorefinery operations for production of a target chemical, e.g. ethanol, and by-products, e.g. dried distiller's grain, produced by fermenting a feedstock, e.g. corn, with an organism, e.g. yeast.

Provided herein are emulsifiers that can be in the form of emulsions, defatted emulsions, precipitates thereof, and/or dried products thereof (such as powders) and compositions comprising the same, which are produced by fermentation of corn, for example, by simultaneous saccharification and fermentation (SSF).

Provided herein is an emulsifier, which may be in the form of an emulsion, defatted emulsion, defatted emulsion precipitate, and/or dried products thereof (such as a powder) obtained, as a by-product of a biorefinery process. In some embodiments, the emulsion, defatted emulsion, defatted emulsion precipitate, and/or dried product thereof comprises (a) protein, including at least one non-germ protein, (b) grain oil, and (c) moisture, typically in the form of water. In some aspects, the emulsion comprises: (a) less than about 10 percent protein, or from about 1% to about 5% protein including at least one non-germ protein, (b) from about 30% to about 60% grain oil, and (c) from about 40% to about 60% water.

A typical biorefinery process produces one or more post-fermentation process streams. In some aspects, the stream is selected from the group consisting of beer, whole stillage, thin stillage, and syrup. In some embodiments, provided herein is an emulsifier in the form of an emulsion, wherein the emulsion comprises a protein sourced from a post fermentation process stream. In some aspects, the protein comprises at least one non-germ protein.

In some aspects, the protein comprises at least one of globulin-1 S allele precursor, globulin-1, globulin 2 precursor, globulin-1 S allele-like, oleosin Zm-I, oleosin Zm-II, zeamatin-like protein, granule-bound starch synthase, trypsin inhibitor, and gamma zein (16 kDa), and mixtures thereof.

In some aspects, the protein is obtained from an aqueous stream separated from a biorefinery process stream. In some aspects, the protein is sourced from a dried protein stream. In some aspects, the protein is sourced from a concentrated protein stream.

In some aspects, the emulsion further comprises an antimicrobial. In some aspects, the emulsion further comprises an antioxidant.

In some aspects, the emulsion further comprises minerals produced during fermentation. Exemplary minerals may include calcium, copper, iron, magnesium, manganese, phosphorus, potassium, sodium, sulfur, and/or zinc.

In some aspects, the emulsion further comprises modified lipids produced during fermentation such as glycerides, free fatty acids, and alkyl esters derived from the lipids during the fermentation.

In some aspects, the emulsion contains no detectable phospholipids, or less than about 1% phospholipids, or less than about 5% phospholipids.

In some aspects, the emulsion contains less than about 1% polymerization.

In some embodiments, the emulsifier is in the form of a dried product or powder obtained by drying an emulsion, a defatted emulsion, or a defatted emulsion precipitate herein. In some aspects, the dried product or powder comprises (a) from about 2% to about 15% protein, (b) from about 60% to about 85% grain oil, and (c) from about 0.5% to about 10% water.

In other embodiments, the emulsifier is in the form of a defatted emulsion. In some aspects, the defatted emulsion comprises: (a) from about 2% to about 10% protein on a dry weight basis; (b) from about 5% to about 20% grain oil on a dry weight basis; and (c) from about 60% to about 90% water.

In some embodiments, the emulsifier is in the form of a dried and defatted emulsion product or powder obtained from drying the defatted emulsion. In some aspects, the dried and defatted product or powder comprises (a) from about 10% to about 40% protein on a dry weight basis; and (b) from about 20% to about 45% grain oil on a dry weight basis, and (c) a moisture content of less than about 15%.

In some embodiments, the emulsifier is a shelf-stable. In embodiments, the emulsifier is in the form of an emulsion precipitate, a defatted emulsion precipitate, or a dried and defatted precipitate obtained by drying the defatted emulsion precipitate. In some aspects, the dried and defatted precipitate comprises (a) from about 30% to about 60% protein, (b) from about 20% to about 40% grain oil, and (c) less than about 15% water.

Also provided herein is an end-use emulsion including the emulsifier described in any of the embodiments above. In some embodiments, the end-use emulsion comprises: an emulsifier (which may be any of those described above) comprising protein including at least a non-germ protein and grain oil, wherein the emulsifier is a by-product of a biorefinery process; a first substance selected from the group consisting of asphalt, paint, livestock feed, agrochemical, lubricant, insulation, ink, defoaming agent, and industrial coating; and a second substance selected from the group consisting of water, solvent, and non-polar liquid. In some aspects, the emulsifier in the end-use emulsion comprises any of the above described emulsifiers, emulsions, dried products, powders, and/or precipitates thereof and, in one approach, may comprises (i) about 30% to about 60% protein on a dry weight basis; and (ii) about 20% to about 40% grain oil on a dry weight basis and a moisture content of less than about 15%.

In some embodiments, provided herein is a dry defatted emulsion obtained from a grain-to-ethanol biorefinery. In some aspects, the emulsifier comprises protein, grain oil, and a moisture content of less than about 15%. In some aspects, the emulsifier comprises (a) about 30% to about 60% protein on a dry weight basis; (b) about 20% to about 40% grain oil on a dry weight basis; and (c) a moisture content of about 0.5% to about 15%. In some aspects, the dry defatted emulsion or dried defatted emulsion precipitate is reconstituted prior to use. In some aspects, the protein is sourced from a post fermentation process stream. In some aspects, protein is sourced from a biorefinery process stream selected from the group consisting of beer, whole stillage, thin stillage, and syrup. In some aspects, the protein is obtained from an aqueous stream separated from a biorefinery process stream. In some aspects, the protein is sourced from a dried protein stream. In some aspects, the protein is sourced from a concentrated protein stream.

In some aspects, the protein comprises at least one non-germ protein.

Provided herein are compositions comprising the emulsifiers and/or emulsions described in the present disclosure. In some embodiments, compositions are provided comprising an animal feed and an emulsion, such as a dry defatted emulsion, provided herein. In some embodiments, compositions are provided comprising asphalt and an emulsion, such as a dry defatted emulsion, provided herein. In some embodiments, compositions are provided comprising paint and an emulsion, such as a dry defatted emulsion, provided herein. In some embodiments, compositions are provided comprising a lubricant and an emulsion, such as a dry defatted emulsion, provided herein. In some embodiments, compositions are provided comprising defoamer and an emulsion, such as a dry defatted emulsion, provided herein. In some embodiments, compositions are provided comprising an industrial coating and an emulsion, such as a dry defatted emulsion, provided herein. In some aspects, the industrial coating is selected from a release agent, crude oil pollution control, and dust suppressant. In some aspects, the industrial coating is formulated as a spray.

In some embodiments, provided herein are substrates having a surface coated at least in part with the industrial coating described herein. In some aspects, the industrial coating is spray applied to the substrate. In some aspects, the substrate is selected from the group consisting of an asphalt, insulation, gravel, dirt, crude oil, mold form, floor, etc.

In some embodiments, provided herein are methods of producing an emulsifier comprising at least a non-germ protein. In some embodiments, the methods comprise: (i) obtaining a syrup from ethanol fermentation; and (ii) centrifuging the syrup to produce a grain oil and protein emulsion. In some aspects, the syrup comprises concentrated protein. In some aspects, the emulsion comprises about 1% to about 5% protein on a dry weight basis. In some aspects, the non-germ protein comprises at least one of globulin-1 S allele precursor, globulin-1, globulin 2 precursor, globulin-1 S allele-like, oleosin Zm-I, oleosin Zm-II, zeamatin-like protein, granule-bound starch synthase, trypsin inhibitor, and gamma zein (16 kDa), and mixtures thereof. In some aspects, the emulsion further comprises minerals and modified lipids produced during fermentation.

The methods can comprise additional steps, though not confined to any particular order. In some aspects, the methods further comprise (iii) centrifuging the emulsion at least once more to produce a defatted emulsion. In some aspects, the defatted emulsion produced according to this method comprises about 2% to about 10% protein on a dry weight basis. In some aspects, the defatted emulsion produced according to this method comprises less than about 20% grain oil on a dry weight basis. In some aspects, the methods further comprise (iv) centrifuging the defatted emulsion to produce a defatted emulsion precipitate. In some aspects, the methods further comprise (v) drying the defatted emulsion or the defatted emulsion precipitate to a moisture content of less than about 15% to produce a dried defatted emulsion or a dried defatted emulsion precipitate.

In some embodiments, provided herein is an emulsion comprising the emulsifier described above. In some aspects, an emulsion is provided comprising: an emulsifier, comprising at least a non-germ protein, as described herein; a first substance selected from the group consisting of asphalt, paint, livestock feed, agrochemical, lubricant, insulation, ink, defoaming agent, and industrial coating; and a second substance selected from the group consisting of water, solvent, and non-polar liquid. In some aspects, the emulsion can be made according to the methods described herein.

DESCRIPTION

Industrial fermentation involves the breakdown of a feedstock by a micro-organism, e.g. yeast and/or bacteria, into ethanol and one or more by-products. A traditional ethanol fermentation process utilizes grain-based feedstocks (e.g., corn, sorghum/milo, barley, wheat, etc.), or other sugar sources (e.g., sugar cane, sugar beets, etc.). In a typical ethanol plant, however, corn is used as a feedstock and ethanol is produced by fermentation of the corn. Enzymes, whether endogenous to the grain, added to the fermenter, or produced by yeast, convert components of the feedstock into simple sugars. Microorganisms, acting subsequent to or simultaneously with the enzymes, convert the simple sugars to ethanol and carbon dioxide. The fermentation product also includes water and soluble components as well as residual unfermented particulate matter (among other things). The fermentation product is distilled and dehydrated to recover ethanol. The residual matter (e.g., whole stillage) comprising water, soluble components, oil, and unfermented solids can be further processed to separate out desirable fermentation by-products.

The present inventors have determined that certain components released from corn after simultaneous saccharification and fermentation (SSF) form a stable emulsion and can have the same or better utility as other emulsion formulations. Similar fermentations can be carried out on a variety of feed stocks utilizing a variety of organisms to produce a variety of chemicals and by-products.

As such, provided herein are methods, compositions, and uses for by-products obtained from large scale biorefinery operations for production of a target chemical, e.g. food, fuel additives, pharmaceuticals, and ethanol, and by-products, e.g. dried distiller's grain, produced by fermenting a feedstock with an organism, e.g. yeast and/or bacteria. Exemplary feedstocks include any biomass comprised of sugars such as cereal grains, trees, crop residues, etc., including sugars from cane, beets, etc.

Oil emulsions consist of two immiscible liquids where liquid droplets of one polarity are dispersed in a liquid continuous phase of a different polarity. Emulsions are typically formed by high shearing oil, water, and emulsifiers together. High shearing is accomplished by means such as simple pipe flow, static mixers, colloid mills, high-pressure homogenizers, and ultrasound generators.

Considerable effort is made to produce stable emulsions that do not break down prematurely in use. Emulsifiers are used to stabilize emulsions by increasing the kinetic stability of an emulsion. Emulsifiers typically have a polar or hydrophilic part and a non-polar (i.e. hydrophobic or lipophilic) part. Some emulsifiers are more soluble in water and generally form oil-in-water emulsions, while other emulsifiers are more soluble in oil and form water-in-oil emulsions. Surfactants are exemplary emulsifiers.

Emulsifiers including emulsions, defatted emulsions, defatted emulsion precipitates, and/or dried products thereof (i.e., powders) provided herein are by-products of a biorefinery process. The emulsifiers including the emulsions, defatted emulsions, defatted emulsion precipitates, and/or dried products thereof include protein and at least one non-germ protein. In one approach, for example, emulsions herein may have protein in amounts of less than about 10%, or less than about 7%, or less than about 5%, or about 1% to about 5%, about 2% to about 4%, or about 1% to about 3% of the emulsion. The emulsion also comprises about 30% to about 60% grain oil, for example, about 30% to about 50% grain oil, or about 40% to about 60% grain oil, or about 30% to about 40% grain oil, or about 50% to about 60% grain oil. Water can be present in the emulsion in an amount from about 40% to about 60%, or about 40% to about 50%, or about 50% to about 60% water.

An exemplary emulsion is a corn oil emulsion from SSF via dry-grind ethanol production. The emulsion may include emulsifier components generated by the SSF of corn that are unique due to the formation of and integration of proteins including non-germ proteins (discussed more below), minerals, and/or modified lipids, etc. from the SSF. For instance, the modified lipids may include glycerides, free fatty acids, and alkyl esters (i.e., fatty acid ethyl esters, etc.) derived from the fermentation of corn and/or the SSF of corn. The various forms of the emulsifier herein may also include up to about 10,000 ppm of minerals. Exemplary minerals may include one or more of calcium (40 to 100 ppm), copper (1 to 10 ppm), iron (10 to 20 ppm), magnesium (500 to 1000 ppm), manganese (1 to 10 ppm), phosphorus (1000 to 3000 ppm), potassium (1500 to 4000 ppm), sodium (300 to 1000 ppm), sulfur (1000 to 3000 ppm), and/or zinc (1 to 20 ppm). The resulting emulsions, defatted emulsions, defatted emulsion precipitates, and/or dried products thereof contain a high concentration of emulsifier components derived from the SSF of corn including the proteins, the lipids, the modified lipid products, the minerals, and/or starch complexes that can further be used to emulsify non-miscible materials.

The emulsifiers including the emulsions, defatted emulsions, defatted emulsion precipitates, and/or dried products thereof can be added to a hydrophobic material where, in some aspects, the oil of the emulsion can dissolve into the hydrophobic material leading to a viscosity and density reduction, which can further improve emulsibility with water, especially with difficult to emulsify materials (e.g. asphalt). Shear stresses necessary to produce well-dispersed and stable emulsions are improved when viscosity and density are reduced and can be predicted, for example, by the Reynolds number. See, for example, Pal, 2000, Journal of Colloid and Interface Science, 225(2): 359-366. In addition, the high viscosity nature of the corn oil emulsion gives it good lubricity and other potential benefits allowing it to be used in various applications (e.g. lubricants, release-agents, dust suppressant etc.).

The corn oil emulsions, defatted emulsions, precipitates, and/or dried products thereof (which may be powders) described herein are a co-product (or by-product) of ethanol production from corn. Special care is usually required to produce stable emulsions by changing the formulations so that the emulsions are stable and retain utility in a particular application. Proteins or other compounds derived from whey, soy, or corn might be used as emulsifiers in a similar fashion but require some modification and/or isolation in order to get similar efficacy. In contrast, no-cook SSF of corn flour releases proteins and other emulsifiers, generating the corn oil emulsion. The emulsions, emulsifiers, and/or components thereof can then be isolated with established technology.

While not wishing to be held to theory, the inventors have determined that the corn oil based emulsions, defatted emulsions, precipitates, and/or dried products thereof contain specific proteins that contribute to emulsibility. In addition, other non-protein elements are possibly modified during ethanol production and may contribute to emulsibility. It has also been determined that the emulsion is unstable at pH values from about 7.0 to about 8.5. The concentration of the various emulsifier components derived from the SSF of corn for example (such as proteins, minerals, carbohydrates, lipids, and modified lipids) present in the emulsion, defatted emulsion, precipitates, and/or dried products thereof can affect how the emulsifiers perform in various applications. Tables 2 to 6 in the Examples below provide exemplary compositional analyses of emulsions or defatted emulsions herein.

An emulsifier disclosed herein can be in the form of an emulsion, defatted emulsion, defatted emulsion precipitate and/or dried products thereof (such as powders). The emulsion, defatted emulsion, defatted emulsion precipitate, and/or dried products thereof can comprise (a) protein including at least one non-germ protein; (b) grain oil; and (c) water, also referred to herein as moisture, and is a by-product of a biorefinery process, for example, corn ethanol fermentation. In some embodiments, the emulsion comprises (a) less than about 10 percent protein or from about 1% to about 5% protein including at least one non-germ protein, (b) from about 30% to about 60% grain oil, and (c) from about 40% to about 60% water, wherein the emulsion is a by-product of a biorefinery process. The emulsion contains no detectable phospholipids and/or less than about 1% polymerization. The emulsion can include minerals and modified lipids produced during fermentation as discussed above.

The biorefinery process generates source streams that include beer, whole stillage, thin stillage, and syrup obtained from corn fermentation.

The protein present in the emulsifiers herein, such as the emulsions, defatted emulsions, defatted emulsion precipitates, and/or dried products thereof, can be sourced from a biorefinery process source stream, such as from a dried protein stream or a concentrated protein stream. The protein can be sourced from an aqueous stream separated from a biorefinery process stream. The at least one protein can be globulin-1 S allele precursor, globulin-1, globulin 2 precursor, globulin-1 S allele-like, oleosin Zm-I, oleosin Zm-II, zeamatin-like protein, granule-bound starch synthase, trypsin inhibitor, and gamma zein (16 kDa), and mixtures thereof.

The emulsifier can be dried, i.e. part of or most of the moisture can be removed. An exemplary dried emulsifier may be a dried emulsion product obtaining by drying the emulsion and comprises (a) from about 2% to about 15% protein, (b) from about 60% to about 85% grain oil, and (c) less than about 10 percent water or from about 0.5% to about 10% water.

The emulsifier can be defatted, i.e. part of or most of the oil can be removed. An exemplary defatted emulsifier may be a defatted emulsion and comprises (a) from about 2% to about 10% protein on a dry weight basis; (b) from about 5% to about 20% grain oil on a dry weight basis; and (c) from about 60% to about 90% water.

The emulsifier can be dried and defatted. An exemplary dried and defatted emulsifier may be obtained by drying the defatted emulsion (preferably to form a powder) and comprises (a) from about 10% to about 40% protein on a dry weight basis; (b) from about 20% to about 45% grain oil on a dry weight basis, and (c) a moisture content of less than about 15%. In some aspects, the emulsifier is a shelf-stable emulsifier either by further removing water or adding additional components. For instance, shelf-stable emulsifier may obtained by drying the defatted emulsion and comprises (a) from about 30% to about 60% protein, (b) from about 20% to about 40% grain oil, and (c) less than about 15% water, for example, a moisture content of about 0.5% to about 15%. In some aspects, the shelf stable emulsifier may further include an antimicrobial and/or an antioxidant. Exemplary antioxidants include TBHQ, ethoxyquin, etc. Exemplary antimicrobials include phenoxyethanol, quaternary ammonium compounds, isothiazolinones, etc.

An exemplary dry defatted emulsifier from a grain-to-ethanol biorefinery is obtained from drying a defatted emulsion and comprises (a) about 30% to about 60% protein on a dry weight basis; (b) about 20% to about 40% grain oil on a dry weight basis; and (c) a moisture content of about 0.5% to about 15%. The dry defatted emulsifier can be obtained from an aqueous stream separated from a biorefinery process stream. The biorefinery process stream can be selected from the group consisting of beer, whole stillage, thin stillage, and syrup. The dry defatted emulsifier can be reconstituted prior to use, or can be added directly to a substance to form an emulsion.

The emulsifier can be a defatted precipitate. An exemplary defatted and precipitated emulsifier may be a dried and defatted emulsion precipitate and comprises (a) from about 30% to about 60% protein on a dry weight basis; (b) from about 5% to about 20% grain oil on a dry weight basis; and (c) less than about 15% water.

Table 1 provides exemplary moisture, protein, fat, and ash ranges on a % w/w basis for the emulsifier in its various emulsion and/or dried product (i.e., powder) forms.

TABLE 1

Moisture, Protein, and Oil Ranges for Exemplary Emulsions

| Material | % w/w Range (Typical) | | | |
|---|---|---|---|---|
| | Moisture | Protein | Fat | Ash |
| Emulsion | 30-60 (35) | 1-5 (3) | 30-60 (50) | 2-10 (5) |
| Dried Emulsion | ≤10 (5) | 2-15 (5) | 60-85 (75) | 5-20 (10) |
| Defatted Emulsion | 60-90 (70) | 2-10 (6) | 5-20 (10) | 2-15 (7) |
| Dried Defatted Emulsion | ≤15 (5) | 10-40 (20) | 20-45 (30) | 10-35 (20) |
| Dried Defatted Emulsion Precipitate | ≤15 (5) | 30-60 (45) | 20-40 (30) | 5-20 (10) |

An end-use emulsion, in some aspects, can comprise a first and second substance combined with an emulsifier, such as any of the emulsion, defatted emulsion, defatted emulsion precipitates, and/or dried products thereof as described herein. The first substance may be selected from the group consisting of asphalt, paint, livestock feed, agrochemical, lubricant, insulation, ink, defoaming agent, and industrial coating to suggest but a few examples. The second substance may be selected from the group consisting of water, solvent, and non-polar liquid to suggest a few examples.

Methods of Preparing Emulsions, Defatted Emulsions, Defatted Emulsion Precipitates, and Dried Products Thereof Suitable for Use as Emulsifiers The step of separating an oil fraction from a fermented product can be accomplished by applying a first force to the oil fraction, which separates out the emulsion. The force can be applied via a separator or centrifuge. The separator can be, for example, a press or extruder; the centrifuge can be, for example, a decanter centrifuge, a disk stack centrifuge, a disk nozzle centrifuge, or a screen centrifuge. The emulsion can be extracted prior to evaporation of the thin stillage, prior to decantation of wet cake, or prior to distillation of the beer formed from SSF. Additional and/or alternative processes for isolating a corn oil fraction from a fermented product are disclosed in U.S. Pat. No. 8,702,819, incorporated by reference herein.

Figure 1:
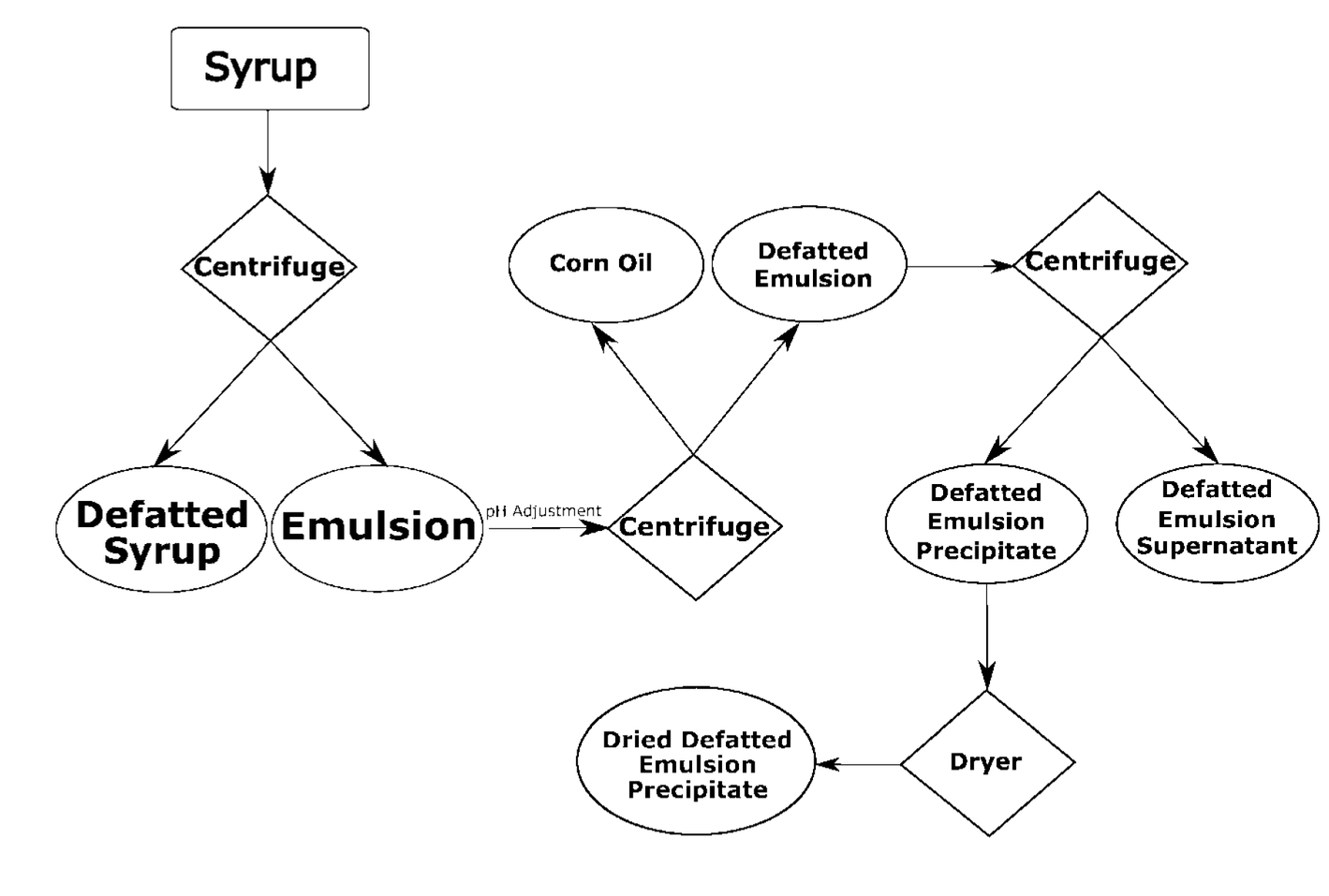
FIG. 1 is a schematic depicting various steps of centrifuging and drying for removing an emulsion, a defatted emulsion, a defatted emulsion precipitate, and a dried defatted emulsion precipitate from syrup removed from fermentation stillage. A pH adjustment to about pH 7 to about pH 8.5 results in the release of corn oil from the emulsion to provide a defatted emulsion. While the step of drying is shown after defatting the emulsion and separating a precipitate therefrom, a drying step can be performed at any point to remove moisture from the emulsion or other streams, for example, prior to defatting an emulsion or defatting an emulsion precipitate. In addition, one of skill in the art would understand that the step of centrifuging is exemplary of any mechanism that separates processing streams, including filtration.

As shown in FIG. 1, an exemplary method of producing an emulsifier comprising at least a non-germ protein comprises (i) obtaining a syrup from ethanol fermentation and (ii) centrifuging the syrup to produce a grain oil (defatted syrup) and a water emulsion containing the proteins. The protein emulsion obtained by the first centrifugation step can be used as is as the emulsion described herein, or further steps can be employed to obtain defatted emulsions, precipitates, and/or dried products thereof. For example, the method can further comprise (iii) centrifuging the emulsion at least once more to produce a defatted emulsion. The method can further comprise (iv) centrifuging the defatted emulsion to produce a defatted emulsion precipitate. If desirable, the products at any point can be dried, for example, prior to the second centrifugation step, after the second centrifugation step, or after the third centrifuge step. For example, the method can further comprise (v) drying the emulsion, the defatted emulsion, and/or the defatted emulsion precipitate to a moisture content of less than about 15%, less than 10%, or 0.5 to 10% to produce a dried emulsion product, a dried defatted emulsion product, or a dried defatted emulsion precipitate product. Preferably, the dried products are in the form of a powder, which can be reconstituted prior to use.

Uses of Emulsifiers

The corn oil derived emulsifiers disclosed herein, including the emulsions, defatted emulsions, defatted emulsion precipitates, and/or dried products thereof (where the majority of corn oil is extracted), are compositionally unique and can be used for various industrial applications. The emulsion, defatted emulsion, defatted emulsion precipitate, or dried products thereof (or even separated emulsion components) can be used as the emulsifier component in various industrial compositions. The emulsion or defatted emulsion can be used as-is, further processed to form emulsion precipitates, or dried to form dried products or powders that can be added to stabilize emulsions used in industrial applications. Powders may also be reconstituted before use. Exemplary industrial applications include, but are not limited to, use of the emulsifier components or emulsions, defatted emulsions, defatted emulsion precipitates, or dried products thereof in asphalt, agrochemicals, lubricants, paints, crude oil pollution control, dust suppressant, release agents, etc.

The concentration of proteins, minerals, carbohydrates, and lipids present in the emulsion, defatted emulsion, defatted emulsion precipitates, and/or dried products thereof can be manipulated to tailor performance characteristics for a given application. For example, the emulsion composition and other products derived therefrom can be impacted by corn feedstock variation, biorefinery processing (throughput, syrup solids, centrifuge separation efficiency), various additives used throughout the biorefinery process, etc.

The emulsifier can be added to typical end-use emulsions, e.g. commercially available end-use emulsions. In some aspects, the end-use emulsion comprises: an emulsifier, comprising protein including at least a non-germ protein and grain oil, wherein the emulsifier is a by-product of a biorefinery process; a first substance selected from the group consisting of asphalt, paint, livestock feed, agrochemical, lubricant, insulation, ink, defoaming agent, and industrial coating; and a second substance selected from the group consisting of water, solvent, and non-polar liquid. The emulsifier may be emulsifier components derived from SSF or the above described emulsion, defatted emulsion, defatted emulsion precipitate, and/or dried products thereof.

Animal feeds are, by design, nutrient dense and often contain high levels of added fat. Fat digestion is inefficient in most ruminants and in poultry, though naturally occurring bile salts aid in improving digestibility. However, bile salts are produced in limited quantities, especially in young animals. As such, nutritional emulsifiers can be added to animal feeds to improve fat digestibility (by, for example, enhancing the formation of emulsion droplets, by stimulating the formation of micelles, and by increasing the concentration of monoglycerides in the intestine) providing higher metabolizable energy from a given feed and, in some instances, reducing feed costs. An animal feed, such as a livestock feed, can be formulated with an emulsifier obtained from a biorefinery process stream. For example, an animal feed can comprise a dry defatted emulsion product, such as a dry defatted product obtained from drying the defatted emulsion and having (a) about 30% to about 60% protein on a dry weight basis; (b) about 20% to about 40% grain oil on a dry weight basis; and (c) a moisture content of about 0.5% to about 15%.

An asphalt emulsion is liquid asphalt emulsified in water. Emulsion stability is important during storage, transport, pumping and mixing, but once applied to the road, the emulsion must break or separate back into its original phases. The separation allows the road to begin developing adhesive and cohesive strength, eventually capable of supporting and withstanding the stresses of traffic loading. To obtain an asphalt emulsion, an asphalt composition can be formulated with an emulsifier disclosed herein. For example, an asphalt can comprise a dry defatted emulsion product, such as a dry defatted emulsifier obtained from drying the defatted emulsion and having (a) about 30% to about 60% protein on a dry weight basis; (b) about 20% to about 40% grain oil on a dry weight basis; and (c) a moisture content of about 0.5% to about 15%. Features of the emulsifier which permit the initial characteristics of stability but also the quick breakage upon application can be selected for by adjusting the concentration of the various proteins, minerals, carbohydrates, lipids present in the emulsifier or defatted emulsion.

A paint composition can be formulated with an emulsifier disclosed herein to improve mechanical stability, freeze-thaw stability and shelf-life. For example, a paint can comprise a dry defatted emulsifier, such as a dry defatted emulsifier obtained by drying the defatted emulsion and having (a) about 30% to about 60% protein on a dry weight basis; (b) about 20% to about 40% grain oil on a dry weight basis; and (c) a moisture content of about 0.5% to about 15%.

Lubricant compositions are useful in reducing friction between mechanical parts, resulting in longer useful life for machinery. Lubricant compositions remove heat and contaminants while preventing damaging surface-to-surface contact between moving parts. A lubricant composition can be formulated with an emulsifier disclosed herein along with other components such as oils, waxes, anti-corrosion additives, and anti-oxidants among others. For example, a lubricant can comprise a dry defatted emulsifier, such as a dry defatted emulsifier obtained by drying the defatted emulsion and having (a) about 30% to about 60% protein on a dry weight basis; (b) about 20% to about 40% grain oil on a dry weight basis; and (c) a moisture content of about 0.5% to about 15%. The presence of the emulsifier can prevent or delay separation of the lubricant. The presence of the emulsifier can improve dispersion, increase colloid, improve storage stability, or improve rheological, and application properties of the lubricant.

Foams increase inefficiencies in a given system, for example, by causing defects on surface coatings or preventing the efficient filling of containers. Defoamers are used to eliminate existing foam, while anti-foamers prevent the formation of further foam. Defoamers and anti-foamers are used in detergents, as ingredients in food, as anti-bloating agents, and in various industrial processes and products such as the pulping and paper industries, in food processing, oil drilling, machine tool industry, with cutting tools, in hydraulics, biorefineries, and in wastewater treatment. A defoamer or anti-foamer can be formulated with an emulsifier disclosed herein. For example, a defoamer can comprise a dry defatted emulsifier, such as a dry defatted emulsifier obtained by drying the defatted emulsion and having (a) about 30% to about 60% protein on a dry weight basis; (b) about 20% to about 40% grain oil on a dry weight basis; and (c) a moisture content of about 0.5% to about 15%.

Industrial coatings have many purposes. For example, some industrial coatings are useful in improving water durability and wet adhesion of a substrate, adding color and/or enhancing gloss, and/or increasing scratch resistance and corrosion resistance. To improve dispersion, increase colloid stability and surface properties of aqueous coatings, improve storage stability, allow full color development, or improve rheological and application properties, an industrial coating can be formulated with an emulsifier disclosed herein. For example, an industrial coating can comprise a dry defatted emulsifier, such as a dry defatted emulsifier obtained by drying the defatted emulsion and having (a) about 30% to about 60% protein on a dry weight basis; (b) about 20% to about 40% grain oil on a dry weight basis; and (c) a moisture content of about 0.5% to about 15%. The coating can be a release agent, can be used for crude oil pollution control, or can be formulated as a dust suppressant. Industrial coatings containing the emulsifier can come in any form, for example, can be formulated as a press-on tape or a spray.

Contemplated herein are substrates having a surface coated with an industrial coating formulated with an emulsifier disclosed herein. For example, the substrate can be coated with an industrial coating comprising a dry defatted emulsifier, such as a dry defatted emulsifier obtained by drying the defatted emulsion and having (a) about 30% to about 60% protein on a dry weight basis; (b) about 20% to about 40% grain oil on a dry weight basis; and (c) a moisture content of about 0.5% to about 15%. The industrial coating can be spray applied to the substrate, or pressed onto the substrate. The substrate can be asphalt, insulation, gravel, roofing shingles, automobile or other mechanical parts, technological equipment, instruments, a mold form, flooring, etc.

Any of the end uses noted above may also include emulsifiers obtained from the emulsions, the defatted emulsions, the defatted emulsion precipitates, and/or any dried products thereof as described within this disclosure.

Ethanol fermentation process parameters provided in U.S. Pat. No. 8,702,819 can be used to generate the emulsion or defatted emulsion disclosed herein, and to tailor performance characteristics for a given application as described above. Exemplary process parameters include: process temperature, adjusting the pH used to break the emulsion (breaking at higher pH results in greater release of proteins, versus lower pH), residence time at emulsion breaking pH (composition changes include a change in particle size and free proteins the longer the residence time), centrifuge type, and any other operating parameters (distillation temperature, evaporator temperature, residence time), etc.

EXAMPLES

The following examples are provided for illustrative purposes only and are not intended to limit the scope of the invention. In these examples, as well as elsewhere in this application, all ratios, parts, and percentages are by weight unless otherwise indicated.

Example 1

The oil emulsion and defatted emulsion (after pH adjustment and subsequent oil extraction), described herein, differ in multiple ways from other emulsions or oil bodies mentioned in various publications. For example, Majoni et al. (*J. Am. Oil Chem. Soc.* 88, 425-434, 2011) evaluated different parameters including chemicals, pressure, temperature, and mixing in order to maximize oil recovery from condensed corn distillers solubles (syrup). The authors surmise that at higher pH, proteins are easily solubilized to make a better emulsifier. Indeed, the authors reported higher oil recovery at acidic pH values. However, the oil emulsion described herein is stable at those pH values and only becomes unstable at pH values between 7 and 8.5.

Comparing the most prevalent proteins in (a) the presently described oil emulsion with (b) the defatted emulsion precipitate after pH adjustment to 8.3 (Table 2), demonstrates that increasing the pH causes the proteins to precipitate, thus freeing the oil to be extracted.

TABLE 2

Top 10 Proteins in Oil Emulsion and Defatted Emulsion Precipitate

| Oil Emulsion[a] | Defatted Emulsion Precipitate[b] |
|---|---|
| Globulin-1 S allele precursor | Globulin-1 S allele precursor |
| Globulin-1, partial | Globulin-1, partial |
| Globulin 2 precursor | Globulin 2 precursor |
| Oleosin Zm-I | Globulin-1 S allele-like |
| Oleosin Zm-II | Oleosin Zm-I |
| Zeamatin-like protein | Oleosin Zm-II |
| Granule-bound starch synthase | Trypsin inhibitor |
| Trypsin inhibitor | Zeamatin-like protein |
| 16 kDa gamma zein | Granule-bound starch synthase |
| Probable non-specific lipid-transfer protein 2 | uncharacterized protein LOC100280650 precursor |

[a]Oil emulsion prior to pH adjustment (pH ≈ 3.8)
[b]Defatted Emulsion precipitate formed after pH adjustment (pH ≈ 8.3) and isolated via centrifugation Zayas (*Cereal Chem.* 66, 263-267, 1989) and Nikiforidis (*J. Agric. Food Chem.* 57, 5591-5596, 2009) mention the use of germ proteins as emulsifiers to generate emulsions or oil bodies. However, these emulsifiers mentioned in Zayas are exclusively germ proteins and do not include other components of the emulsion described herein such as non-germ proteins, minerals, and modified lipids produced during fermentation. The compositional differences account for the physical difference in the emulsions, most notably the stability at different pH values. For example, Nikiforidis et al. describes the instability of the produced oil bodies when the pH is between 3.8 and 6.5. Similarly, Zayas et al. describes increasing emulsifying capacity and stability with increasing pH especially between 7 and 8.5.

Example 2

Different samples of an emulsion (1, 2, and 3) were obtained from POET biorefineries for compositional analysis. The emulsions were analyzed for volatiles by a Mettler Toledo HR83-P Halogen Moisture Analyzer. The oil content of the emulsions was determined gravimetrically via multiple extractions with chloroform. The non-oil solids were determined gravimetrically as the remaining dried solids after oil extraction. The mineral content of the dried solids were determined by Foundation Analytical Laboratory by ICP following microwave digestion. The amino acid profile was determined by Midwest Laboratories on the dried emulsion or dried defatted emulsion according to AOAC 994.12 (Alt. III). Free fatty acid (FFA) content of the emulsion was determined using a Mettler Toledo T70 titrator using diethyl ether and ethanol as the diluent and potassium hydroxide in ethanol as the titrant. See Tables 3-5.

The most abundant proteins in the emulsions were identified by Q exactive HF-X mass spectroscopy. Samples were prepared by first extracting oil from the emulsion using chloroform. Next, the proteins in the defatted emulsion were then solubilized by boiling in 8M urea. The solution was then further diluted 1:10 in 8M urea with the addition of 4%(% w/w) SDS to assist solubilization. Samples were sent to Bioproximity to perform the prep and analysis for identification. Prep and analysis included protein extraction and cleanup, trypsin digestion, solid-phase extraction, and UPLC-MS/MS including Thermo Q-Exactive HF-X quadrupole-Orbitrap mass spectrometry. Only the 10 most abundant proteins are shown in each case. See Table 6.

TABLE 3

Compositional Analysis of Emulsions on As-is Basis

| Sample | % Non-volatiles (% w/w) | % Oil (% w/w) | % Non-oil solids (% w/w) | Total Elemental Minerals (ppm) | % FFA (% w/w) |
|---|---|---|---|---|---|
| Emulsion 1 | 69.7% | 55.2% | 15.3% | 6509 | 7.5% |
| Emulsion 2 | 61.6% | 44.9% | 16.4% | 9289 | 10.2% |
| Emulsion 3 | 44.5% | 29.5% | 14.9% | 8565 | 5.8% |

TABLE 4

Elemental Mineral Analysis of Emulsions on As-is Basis

| Elemental Mineral | Emulsion 1 (ppm) | Emulsion 2 (ppm) | Emulsion 3 (ppm) |
|---|---|---|---|
| Calcium | 46 | 67 | 80 |
| Copper | 1 | 1 | 3 |
| Iron | 12 | 17 | 12 |
| Magnesium | 685 | 905 | 923 |
| Manganese | 3 | 4 | 4 |
| Phosphorous | 1621 | 2156 | 2325 |
| Potassium | 2082 | 3022 | 3060 |
| Sodium | 476 | 814 | 217 |
| Sulfur | 1575 | 2289 | 1932 |
| Zinc | 9 | 12 | 10 |
| Total | 6509 | 9289 | 8565 |

TABLE 5

Amino Acid Profile of Emulsion and Defatted Emulsion on As-is Basis

| Amino Acid | Emulsion (% w/w) | Defatted Emulsion (% w/w) |
|---|---|---|
| Alanine | 0.21% | 0.24% |
| Arginine | 0.21% | 0.19% |
| Aspartic Acid | 0.24% | 0.22% |
| Cystine | 0.10% | 0.10% |
| Glutamic Acid | 0.44% | 0.45% |
| Glycine | 0.18% | 0.16% |
| Histidine | 0.10% | 0.10% |
| Isoleucine | 0.11% | 0.09% |
| Leucine | 0.22% | 0.18% |
| Lysine (total) | 0.15% | 0.14% |
| Methionine | 0.08% | 0.03% |
| Phenylalanine | 0.12% | 0.10% |
| Proline | 0.25% | 0.16% |
| Serine | 0.15% | 0.14% |
| Threonine | 0.09% | 0.07% |
| Tyrosine | 0.10% | 0.10% |
| Tryptophan | 0.03% | 0.03% |
| Valine | 0.17% | 0.15% |
| Total | 2.95% | 2.65% |

TABLE 6

Top 10 Emulsion Proteins by Relative Abundance

| NCBI Reference Sequence | Protein Name |
|---|---|
| NP_001354320.1 | Globulin-1 S allele precursor |
| PWZ58219.1 | Oleosin Zm-II |
| NP_001295419.1 | Globulin 2 precursor |
| NP_001105338.2 | Oleosin Zm-I |
| ACZ74557.1 | Granule-bound starch synthase |
| NP_001142211.1 | Uncharacterized protein LOC100274379 |
| AQL09053.1 | Vicilin-like seed storage protein |
| P05494.1 | ATP synthase subunit alpha |
| XP_008655895.1 | Endochitinase A-like |
| NP_001105409.2 | Alcohol dehydrogenase |

The present disclosure is not to be limited in scope by the specific embodiments described herein. Indeed, various modifications provided herein in addition to those described herein will become apparent to those skilled in the art from the foregoing description and the accompanying figures. Such modifications are intended to fall within the scope of the appended claims.

It is noted that, as used in this specification and the appended claims, the singular forms "a," "an," and "the," include plural referents unless expressly and unequivocally limited to one referent. Thus, for example, reference to "a component" includes two or more different components. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A first emulsion composition comprising:
an emulsifier in the form of a second emulsion, wherein the emulsifier includes protein with at least a non-germ protein and grain oil, and wherein the emulsifier is a by-product of a biorefinery process;
a first substance selected from the group consisting of asphalt, paint, livestock feed, agrochemical, lubricant, ink, defoaming agent, and industrial coating; and
a second substance selected from the group consisting of water, solvent, and non-polar liquid; and
wherein the second emulsion includes less than 10% protein by weight, about 30% to about 60% grain oil by weight, and about 40 to about 60 percent water by weight.

2. An emulsion composition comprising:
an emulsifier in the form of a dried emulsion product, wherein the emulsifier includes protein with at least a non-germ protein and grain oil, and wherein the emulsifier is a by-product of a biorefinery process;
a first substance selected from the group consisting of asphalt, paint, livestock feed, agrochemical, lubricant, ink, defoaming agent, and industrial coating; and
a second substance selected from the group consisting of water, solvent, and non-polar liquid; and
wherein the dried emulsion product includes about 2% to about 15% protein by weight, about 60% to about 85% grain oil by weight, and about 0.5% to about 10% water by weight.

3. An emulsion composition comprising:
an emulsifier in the form of a defatted emulsion, wherein the emulsifier includes protein with at least a non-germ protein and grain oil, and wherein the emulsifier is a by-product of a biorefinery process;
a first substance selected from the group consisting of asphalt, paint, livestock feed, agrochemical, lubricant, ink, defoaming agent, and industrial coating; and
a second substance selected from the group consisting of water, solvent, and non-polar liquid; and
wherein the defatted emulsion includes about 2% to about 10% protein by weight, about 5% to about 20% grain oil by weight, about 60% to about 90% water by weight.

4. An emulsion composition comprising:
an emulsifier in the form of a dried defatted emulsion product, wherein the emulsifier includes protein with at least a non-germ protein and grain oil, and wherein the emulsifier is a by-product of a biorefinery process;
a first substance selected from the group consisting of asphalt, paint, livestock feed, agrochemical, lubricant, ink, defoaming agent, and industrial coating; and
a second substance selected from the group consisting of water, solvent, and non-polar liquid; and
wherein the dried defatted emulsion product includes about 10% to about 40% protein on a dry weight basis; about 20% to about 45% grain oil on a dry weight basis, and a moisture content of less than about 15% by weight.

5. An emulsion composition comprising:
an emulsifier in the form of a dried defatted emulsion precipitate product, wherein the emulsifier includes protein with at least a non-germ protein and grain oil, and wherein the emulsifier is a by-product of a biorefinery process;
a first substance selected from the group consisting of asphalt, paint, livestock feed, agrochemical, lubricant, ink, defoaming agent, and industrial coating; and
a second substance selected from the group consisting of water, solvent, and non-polar liquid; and
wherein the dried defatted emulsion precipitate product includes about 30% to about 60% protein on a dry weight basis, about 20% to about 40% grain oil on a dry weight basis, and a moisture content of about 0.5% to about 15% by weight.

6. The emulsion composition of claim 5, wherein the dried defatted emulsion precipitate product is reconstituted prior to use.

7. The emulsion composition of claim 5, wherein the emulsifier comprises at least a non-germ protein, and wherein the emulsifier is prepared by a method comprising:
(i) obtaining a syrup from ethanol fermentation;
(ii) centrifuging the syrup to produce a defatted syrup and an emulsion;
(iii) centrifuging the emulsion to produce a defatted emulsion; and (iv) centrifuging the defatted emulsion to produce the defatted emulsion precipitate product including a protein with at least one non-germ protein.

8. The emulsion composition of claim 7, wherein the non-germ protein includes at least one of globulin-1 S allele precursor, globulin-1, globulin 2 precursor, globulin-1 S allele, oleosin Zm-I, oleosin Zm-II, zeamatin protein, granule-bound starch synthase, trypsin inhibitor, and gamma zein (16 kDa).

9. The emulsion composition of claim 7, wherein the emulsifier includes about 30% to about 60% protein on a dry weight basis.

10. The emulsion composition of claim 9, wherein the emulsifier further comprises minerals and modified lipids produced during fermentation.

11. The emulsion composition of claim 9, wherein the emulsifier includes about 20% to about 40% grain oil on a dry weight basis.

12. The emulsion composition of claim 11, further comprising drying the defatted emulsion precipitate product to a moisture content of less than about 15% to produce the emulsifier in the form of the dried defatted emulsion precipitate product.

13. The emulsion composition of claim 7, wherein the syrup is obtained from a biorefinery process stream selected from the group consisting of beer, whole stillage, thin stillage, and syrup.

\* \* \* \* \*